United States Patent [19]

Urano et al.

[11] 4,126,873

[45] Nov. 21, 1978

[54] CONTROL CIRCUIT FOR THE SHUTTER HOLDING MAGNET OF A CAMERA

[75] Inventors: Fumio Urano, Omiya; Masahiro Kawasaki, Tokyo, both of Japan

[73] Assignee: Asahi Kogaku Kogyo Kabushiki Kaisha, Tokyo, Japan

[21] Appl. No.: 686,442

[22] Filed: May 14, 1976

[30] Foreign Application Priority Data

May 16, 1975 [JP] Japan ................... 50-58367

[51] Int. Cl.² .............................................. G03B 7/08
[52] U.S. Cl. ...................................... 354/51; 354/60 L
[58] Field of Search ................. 354/50, 51, 60 R, 60 L

[56] References Cited

U.S. PATENT DOCUMENTS

| 3,863,263 | 1/1975 | Itagaki | 354/51 X |
| 3,947,855 | 3/1976 | Inoue et al. | 354/50 |
| 3,967,288 | 6/1976 | Yamamoto | 354/50 X |
| 3,987,464 | 10/1976 | Kitai et al. | 354/60 L X |

FOREIGN PATENT DOCUMENTS 46,130  4/1975  Japan.

Primary Examiner—Michael L. Gellner
Attorney, Agent, or Firm—Sughrue, Rothwell, Mion, Zinn and Macpeak

[57] ABSTRACT

A shutter release circuit for a camera is disclosed having the capability of deenergizing the shutter holding magnet when the power source voltage drops below the value capable of sustaining normal operation of the photometric and operational circuit.

2 Claims, 3 Drawing Figures

CONTROL CIRCUIT FOR THE SHUTTER HOLDING MAGNET OF A CAMERA

BACKGROUND OF THE INVENTION

This invention relates to cameras having electronically controlled shutters, and more particularly to a type thereof wherein a voltage check circuit is provided within the shutter control circuit, and the operation of the camera is inhibited by cutting the electric current flowing through the shutter holding magnet when the voltage of the power source is reduced below the level which will sustain normal operation of the photometric and operational circuitry.

Heretofore, various examples of a camera having an electronically controlled shutter are known, wherein the shutter operation is inhibited to prevent erroneous operation of the camera or degradation in the photograph when there is an omission or a decrease in the power of the power source for the control circuit. One such example can be found in Japanese Patent Laid-Open No. 46130/1975.

Such a type of camera is advantageous in that when the operation of the magnet becomes erratic, the camera is made inoperative and the possibility of taking inferior photographs as the result of erratic operation is thereby eliminated. However, in the operation of such cameras, a range of voltage causing erroneous operation exists between the normal operational voltage for the electronic circuit and a voltage at which the camera is made inoperative for the purpose of alarming against the erratic operation. Within the latter range successful photography is not guaranteed. This is because the voltage at which the magnet can hold the sustain rear shutter screen open is not equal to the operational voltage of the photometric and operational electronic circuit, and furthermore cannot be made equal thereto because of a wide variety in the holding characteristic of individual magnets and the temperature variation of the characteristic of each magnet. For his reason, the minimum voltage for holding open the rear shutter screen by the magnet is ordinarily preset to a value below that required to maintain normal operation of the photometric and operational circuitry.

SUMMARY OF THE INVENTION

In accordance with the present invention circuitry is provided for preventing the shutter holding magnet from becoming energized when the power source voltage drops below a value required to sustain operation of the photometric and operational circuit. The circuit for controlling the shutter holding magnet includes a power source voltage check circuit which detects when the power source drops below a predetermined value. The check circuit output is ANDed in and AND function circuit with the output of a comparison circuit normally found in the shutter release circuit portin of a photometric and operational circuit.

The invention will be better understood from the following description with respect to preferred embodiment thereof when read in connection with the accompanying drawing.

DETAILED DESCRIPTION OF THE DRAWING

Figure 1:
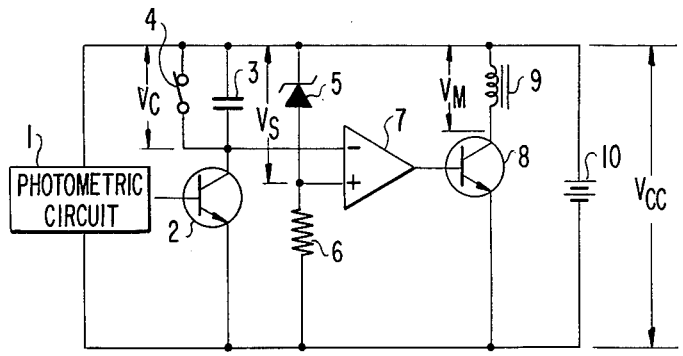
FIG. 1 is a schematic diagram of a prior art circuit for controlling the operation of the shutter holding magnet.

Referring to FIG. 1, the elements shown in schematic circuit form comprise the shutter holding magnet control circuit portion of a camera's photometric and operational circuit. The block 1 represents the rest of the camera's photometric and operational circuitry, including that part of the circuit which produces the apex-indicative values $B_V$, $A_V$, and $S_V$ of the brightness B of the object, the aperture A of the lens, and the sensitivity S of the film. The output of the photometric and operational circuit 1 is connected with the base of a transistor 2 whose collector is connected with a timing capacitor 3 and a trigger switch 4, and also with an inverting input terminal of a comparator 7 including an amplifier. Numeral 5 designates a zener diode connected in series with a resistor 6 and a power souce 10 so that the junction between the zener diode 5 and the resistor 6 constitutes a constant voltage source which is also connected with the non-inverting input terminal of the comparator 7. A magnet 9 is provided to hold the shutter screen open. In the case where the magnet 9 is connected through a transistor 8 directly to the output of the comparator 7, the output of the comparator 7 is inverted when the voltage across the capacitor 3 equals the voltage across the zener diode. The voltage across capacitor 3 is determined by the collector current of the transistor 2 and the capacity of the capacitor 3, and begins rising from zero when switch 4 is closed. The inversion of the comparator output places the transistor 8 into OFF state, cutting the electric current flowing through the magnet 9, and releasing the rear screen.

Figure 2:
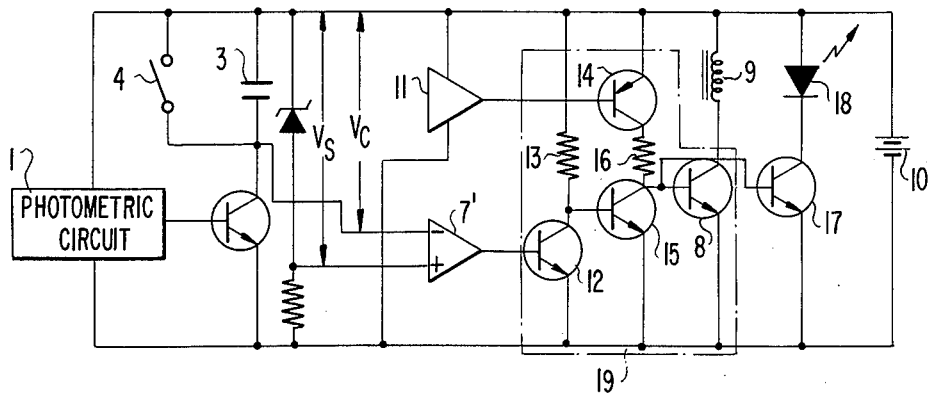
FIG. 2 is a schematic diagram of a circuit in accordance with the present invention.

A circuit, as shown in FIG. 2, constructed according to the present invention, differs from the prior art circuit by the addition of, a voltage check circuit 11, and an amplifier 19 interposed between the ouptput of comparator 7' and magnet 9. The amplifier 19 provides an AND circuit function having the input terminals thereof connected with the outputs of the comparator 7' and the voltage check circuit 11. By this arrangement, the electric current flowing through the magnet 9 is interrupted regardless of the output condition of the comparator 7' when the voltage of the power source 10 drops below a lower limit for operating the entire electric circuit in a normal manner.

The circuit of FIG. 2 is so arranged that the output of the comparator 7' is ON when $V_C$ is less than $V_S$ and OFF when $V_C$ is greater than $V_S$, and the output of the voltage check circuit 11 is ON when the power source voltage is higher than the rated voltage and is OFF when the power source voltage is lower than the rated voltage, wherein $V_C$ is the terminal voltage of the capacitor 3, and $V_S$ is the reference voltage for the comparator. In the case where the power source voltage is higher than the rated value and $V_C$ is less than $V_S$, transistors 12 and 14 are brought into the ON state and the transistor 15 is brought into the OFF state, thereby bringing the transistor 8 into the ON state because the base current flows through the transistor 14 and a resistor 16. Thus the magnet 9 is energized. When $V_C$ is greater than $V_S$, the transistor 12 is turned OFF and the transistor 15 is turned ON by the base current flowing through a resistor 13. Thus the base-emitter voltage $V_{BE}$ of the transistor 8 is minimized causing no current to flow through the collector connected with the magnet 9 of the transistor 8. In the case where the power source voltage is lower than the rated value, the transistor 14 is turned OFF, and the transistor 8 becomes non-conducting regardless of the condition of the comparator 7'.

As described above, the amplifier circuit 19 is formed into an AND circuit having the output of the comparator 7' connected to the base of the transistor 12 and the output of the voltage check circuit 11 connected to the base of the transistor 14. Thus, when the power source voltage is above the rated voltage, the output of the amplifier circuit 19 is controlled by the output of the comparator 7', and when the power source voltage is below the rated voltage, the output of the amplifier circuit 19 is held in the OFF state regardless of the output condition of the comparator 7', thereby supplying no current through the magnet 9. If the camera is so constructed that the operation thereof is inhibited by any mechanical means when the magnet is not energized after the depression of the release, alarming for the magnet and the inhibition of the operation of camera can be carried out simultaneously when the power source voltage is reduced below the rated value.

Figure 3:
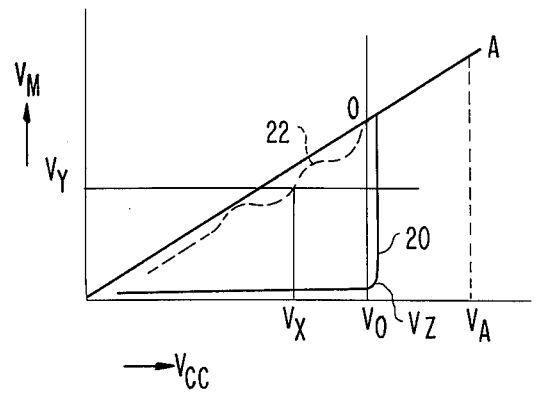
FIG. 3 is a diagram showing the relation between the power source voltage $V_{CC}$ and the terminal voltage $V_M$ across the magnet.

In FIG. 3 showing the relation between the power source voltage $V_{CC}$ and the terminal voltage $V_M$ of the magnet, $V_O$ designates the lower limit of the operational voltage of the electric circuit, $V_Y$ designates the minimum voltage across the magnet for holding the rear screen, $V_X$ designates the power source voltage at the time of the magnet terminal voltage is reduced to $V_Y$.

In the conventional circuit operation becomes abnormal when the power source voltage is reduced to the lower limit voltage $V_O$ corresponding to the point O, and the characteristic thereafter is disturbed as shown by the broken line 22. Since the magnet can hold the rear screen until the voltage thereacross is reduced to the voltage $V_Y$, the alarm for the magnet is not operated until the power source voltage is reduced to $V_X$ corresponding to the minimum magnet voltage $V_Y$. Thus, in the conventional circuit, the camera can operate in a voltage range wherein the circuit is not operated satisfactorily, and therefore pictures of good quality will not be obtained.

According to the present invention, the magnet voltage $V_M$ is reduced to substantially zero as indicated by the solid line 20 when the power source voltage $V_{CC}$ is reduced to the rated value $V_Z$, and the magnet thereafter cannot hold the rear screen. Thus, the magnet will not hold the rear screen and the operation of the camera is inhibited. As will be apparent, no voltage range tending to cause erroneous operation of the carera exists in the circuit, and the reliability of the operation of the camera is substantially elevated.

In the circuit of FIG. 2, a transistor 17 is further provided inparallel with the transistor 8, and a luminescent diode 18 is connected between the collector of the transistor 17 and the power source 10. In this arrangement, the output of the voltage check circuit 11 is simultaneously applied to the magnet 9 and the luminescent diode 18, and the relation between the diode voltage and the power source voltage can be indicated by that of FIG. 3 when the magnet voltage along the ordinate is replaced by the diode voltage. Thus, when the power source voltage $V_{CC}$ reaches $V_Z$, the luminescent diode so far ignited is extinguished. Since the magnet alarm is effectuated mechanically, there is a possibility of the alarm being not discriminated from another mechanical fault of the camera. The provision of the liminescent diode 18 can eliminate this disadvantage, and the effectuation of the magnet alarm is also indicated in a visual manner.

According to the present invention, the energization of the magnet is terminated when the power source voltage is reduced in excess of the rated voltage, and the operation of the camera is blocked mechanically because the magnet is incapable of holding the rear screen after the release of the shutter.

What is claimed is:

1. In a camera circuit of the type having a pair of terminals adapted to be connected to a power source, an electromagnet energizing coil for energizing an electromagnet to hold a shutter screen in one position, a comparison circuit for providing an ON output and an OFF output, respectively, to control the energization and deenergization of said coil during normal operation of said camera circuit, the improvement comprising, a voltage check circuit connected to said power source for providing an ON output when the voltage across said pair of terminals is at or above a predetermined voltage for operating said camera circuit and an OFF output when the voltage across said pair of terminals is below said predetermined voltage, and AND function circuit means having two inputs connected respectively to the outputs of said voltage checking circuit and said comparison circuit, said AND function circuit means having an output connected to said coil for energizing said coil when both said voltage check circuit and said comparison provide ON output voltages to said respective two inputs of said AND function circuit means and for otherwise deenergizing said coil, said AND function circuit comprises, first through fourth transistors, said fourth transistor having its collector-emitter terminals connected in series with said coil, said first transistor having its collector-emitter terminals connected in series with a first resistance across said pair of terminals, said second and third transistors having their collector-emitter terminals connected in series across said pair of terminals, the output terminal of said first transistor being connected to the input terminal of said third transistor, and the output terminal of said third transistor being connected to the input terminal of said fourth transistor, the input terminals of said first and second transistors being connected to the outputs of said comparison circuit and voltage check circuit, respectively, for turning on said first and second transistors only in response to respective ON outputs therefrom, whereby ON outputs from both circuits result in said third transistor being cut off and said fourth transistor being conducting, and a visual alarm circuit connected to the output of said AND function circuit means for providing a visual indication of energization state of said coil.

2. A camera circuit as claimed in claim 1 wherein said visual alarm circuit comprises a luminescent diode and a fifth transistor having its emitter-collector terminals connected in series with said diode across said pair of terminals, the input of said diode being connected to the output of said third transistor to result in said diode being energized and deenergized coincidently with said coil.

* * * * *